(12) United States Patent  
Terauchi et al.

(10) Patent No.: US 7,929,693 B2  
(45) Date of Patent: Apr. 19, 2011

(54) KEY GENERATING METHOD AND KEY GENERATING APPARATUS

(75) Inventors: Toshiro Terauchi, Tokyo (JP); Yoichiro Sako, Tokyo (JP); Makoto Inoue, Tokyo (JP); Masamichi Asukai, Kanagawa (JP); Mitsuru Takehara, Tokyo (JP); Takatoshi Nakamura, Kanagawa (JP); Kosei Yamashita, Kanagawa (JP); Yasushi Miyajima, Kanagawa (JP); Toru Sasaki, Tokyo (JP); Masafumi Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 905 days.

(21) Appl. No.: 11/409,629

(22) Filed: Apr. 24, 2006

(65) Prior Publication Data

US 2007/0036355 A1 Feb. 15, 2007

(30) Foreign Application Priority Data

Apr. 25, 2005 (JP) ................................. 2005-126361

(51) Int. Cl.
 *H04L 9/00* (2006.01)
(52) U.S. Cl. .............................. 380/44; 380/45; 713/186

(58) Field of Classification Search ................... 380/44, 380/45, 46, 47; 713/186; 382/115
See application file for complete search history.

(56) References Cited

U.S. PATENT DOCUMENTS

| | | | |
|---|---|---|---|
| 2002/0180586 A1 | 12/2002 | Kitson et al. | |
| 2004/0148526 A1 | 7/2004 | Sands et al. | |
| 2005/0033702 A1* | 2/2005 | Holdsworth | 705/67 |
| 2006/0034457 A1* | 2/2006 | Damgaard et al. | 380/44 |

FOREIGN PATENT DOCUMENTS

| | | |
|---|---|---|
| JP | 06-102877 A | 4/1994 |
| JP | 11-032034 A | 2/1999 |
| JP | 2001-195059 A | 7/2001 |
| JP | 2005-056205 A | 3/2005 |
| WO | WO 03/040924 A1 | 5/2003 |

* cited by examiner

*Primary Examiner* — Kimyen Vu  
*Assistant Examiner* — Baotran N To  
(74) *Attorney, Agent, or Firm* — Wolf, Greenfield & Sacks, P.C.

(57) ABSTRACT

A key generating method is disclosed which includes the steps of: firstly detecting first change information as first change information data; secondly detecting second change information different from the first change information as second change information data; and merging the first change information and the second change information into key information.

18 Claims, 5 Drawing Sheets

FIG. 2A

FIRST TIME

ID OF USER A : 1 0 1 0

BIOMETRIC INFORMATION DATA ON USER A : 1 0 0 1 1 0 1 1

ENVIRONMENTAL INFORMATION DATA ON USER A : 0 1 0 0 0 1 1 0

EOR DATA FROM LOGICAL OPERATION : 1 1 0 1 1 1 0 1

KEY INFORMATION ON USER A :

$\underbrace{1010}_{\text{ID}}$ $\underbrace{\cdots 0001}_{\substack{\text{GENERATION}\\\text{COUNT}\\\text{(FIRST TIME)}}}$ $\underbrace{11011101}_{\text{EOR DATA}}$

FIG. 2B

SECOND TIME

ID OF USER A : 1 0 1 0

BIOMETRIC INFORMATION DATA ON USER A : 1 0 0 1 1 1 1 1

ENVIRONMENTAL INFORMATION DATA ON USER A : 1 1 0 1 0 0 1 0

EOR DATA FROM LOGICAL OPERATION : 0 1 0 0 1 1 0 1

KEY INFORMATION ON USER A :

$\underbrace{1010}_{\text{ID}}$ $\underbrace{\cdots 0010}_{\substack{\text{GENERATION}\\\text{COUNT}\\\text{(SECOND TIME)}}}$ $\underbrace{01001101}_{\text{EOR DATA}}$

USER A

```
ID : 1 0 1 0
BIOMETRIC INFORMATION DATA       : 1 0 0 1 1 1 1 1
ENVIRONMENTAL INFORMATION DATA   : 1 1 0 1 0 0 1 0
EOR DATA FROM LOGICAL OPERATION  : 0 1 0 0 1 1 0 1
```

FIG. 4B

USER B

```
ID : 1 1 0 1
BIOMETRIC INFORMATION DATA       : 0 1 0 1 1 1 0 1
ENVIRONMENTAL INFORMATION DATA   : 0 0 0 0 1 0 1 1
EOR DATA FROM LOGICAL OPERATION  : 0 1 0 1 0 1 1 0
```

FIG. 4C

MERGING PROCESS

|  | ID | EOR DATA |
|---|---|---|
| KEY INFORMATION ON USER A : | 1 0 1 0 | 0 1 0 0 1 1 0 1 |
| KEY INFORMATION ON USER B : | 1 1 0 1 | 0 1 0 1 0 1 1 0 |
| KEY INFORMATION AFTER MERGING | : 1 0 1 0   1 1 0 1 | 0 0 0 1 1 0 1 1 |
|  | ID OF USER A   ID OF USER B | EOR DATA |

KEY GENERATING METHOD AND KEY GENERATING APPARATUS

CROSS REFERENCES TO RELATED APPLICATIONS

The present invention contains subject matter related to Japanese Patent Application JP 2005-126361 filed with the Japanese Patent Office on Apr. 25, 2005, the entire contents of which being incorporated herein by reference.

BACKGROUND OF THE INVENTION

The present invention relates to a method and an apparatus for generating key information (keys) on users (persons).

It has been proposed that the biological conditions of persons such as fingerprints and venographic patterns be detected as key information (keys) for use in one type of applications such as data encryption and personal authentication. It has also been proposed that the user's biological conditions such as heartbeat and body motions be detected as key information for use in another type of applications such as those of controlling the reproduction of contents including music and videos.

An example of the above-mentioned first type of applications is discussed illustratively in Patent Document 1 (Japanese Patent No. 2004-228615) that discloses a key-isolating encryption method involving the use of secret information specific to each user. Another example is depicted in Patent Document 2 (Japanese Patent No. 2004-29920) that discloses an authentication method involving the use of biological information.

An example of the above-mentioned second type of applications is described illustratively in Patent Document 3 (Japanese Patent No. 2001-299980) that discloses a method for changing the tempo of a piece of music being reproduced in keeping with the heartbeat or body motions of a user.

SUMMARY OF THE INVENTION

The method disclosed by Patent Document 1 or 2 involves the use of the same key information about the same person, the result of such key utilization being always the same. That is obvious in view of the stated purpose of encrypting data or authenticating persons.

According to the method disclosed by Patent Document 3, the biological information used as key information and the tempo of music are changed in keeping with the user's heartbeat or body motions. However, the changes in the key information (biological information) or those in the tempo of music are monotonous and predictable. There is nothing unpredictable, surprising or entertaining about these changes.

The present invention has been made in view of the above circumstances and provides a method and an apparatus for generating key information such that the use of it as a key will result in something unforeseen, amazing, or otherwise entertaining.

In carrying out the present invention and according to one embodiment thereof, there is provided a key generating method including the steps of: firstly detecting first change information as first change information data; secondly detecting second change information different from the first change information as second change information data; and merging the first change information and the second change information into key information.

According to the inventive key generating method outlined above, the change information indicative of a biological condition of a user detected as the first change information is merged with the change information representative of an ambient environment of the same user detected as the second change information. The merge generates key information. When the key information thus generated is utilized in a variety of applications, there occurs something unanticipated, unusual, or otherwise diverting.

That is, the use of the key information generated according to the present invention results in unexpectedness, astonishment, or something that is appreciably interesting.

BRIEF DESCRIPTION OF THE DRAWINGS

Further objects and advantages of the present invention will become apparent upon a reading of the following description and appended drawings in which.

DETAILED DESCRIPTION OF THE PREFERRED EMBODIMENTS

Figure 1:
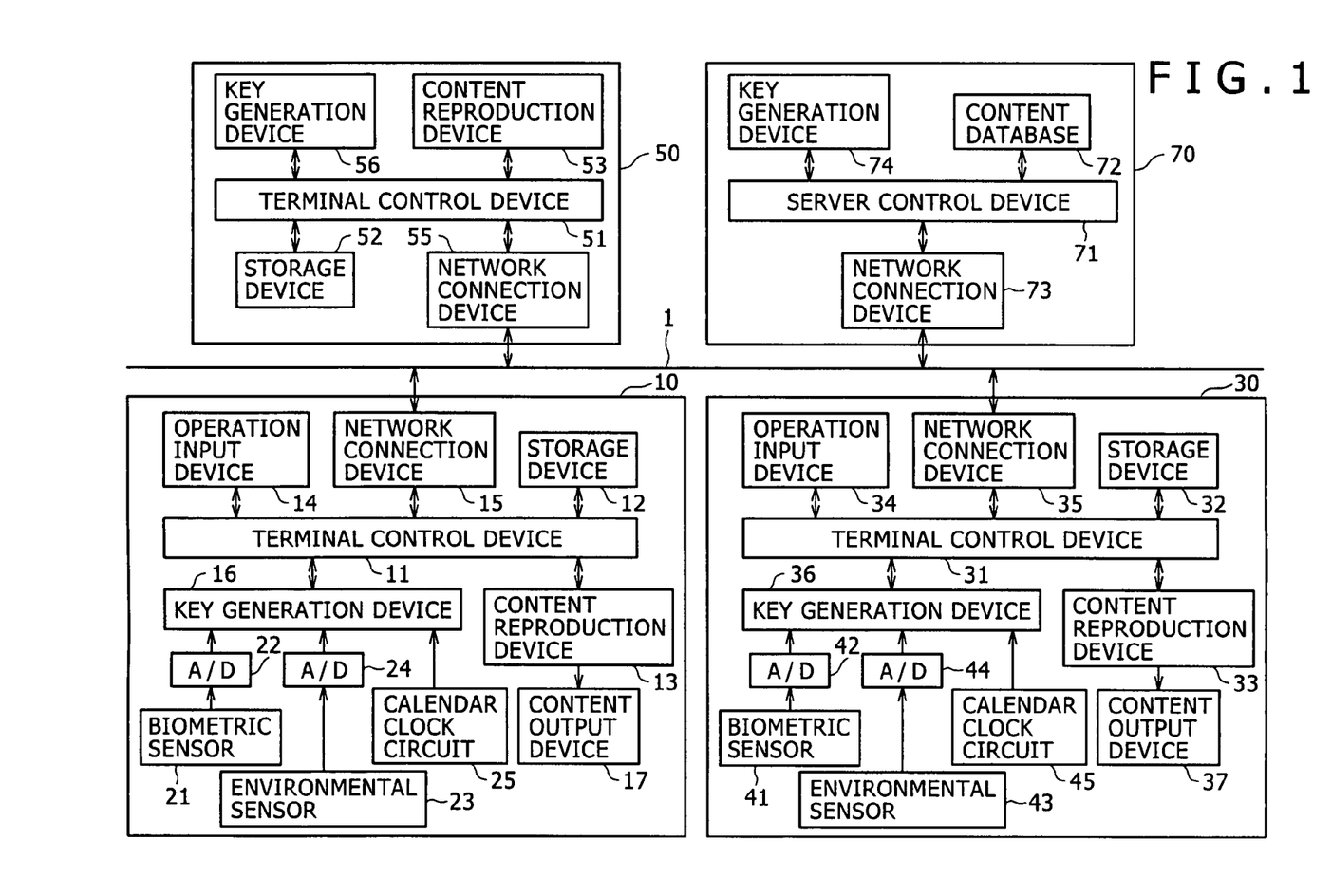
FIG. 1 is a block diagram showing a typical network system including user terminals each generating key information according to the present invention.

1. User Terminals and a Network System Embodying the Invention: FIG. 1

FIG. 1 is a block diagram showing a typical network system including user terminals each generating key information according to the present invention.

In this example, user terminals 10, 30 and 50 are PCs (personal computers), audio and/or video reproducing apparatuses, or mobile phone terminals each capable of connecting to a network 1 such as the Internet or a mobile phone network and of reproducing contents. Forming a network system, the user terminals 10, 30 and 50 are interconnected via the network 1 and are also connected to a server 70.

The terminal 10, for use by a user A, has a terminal control device 11 connected with a storage device 12, a content reproduction device 13, an operation input device 14, a network connection device 15, and a key generation device 16. The content reproduction device 13 is connected to a content output device 17. The key generation device 16 is connected to a calendar clock circuit 25 as well as to a biometric sensor 21 and an environmental sensor 23 through A/D converts 22 and 24 respectively.

The terminal control device 11 is constituted by a CPU, a ROM that has programs and data written therein, and a RAM into which programs and data are loaded for execution. In operation, the terminal control device 11 controls the components of the terminal 10 and carries out processes associated with key uses, as will be discussed later.

The storage device 12 accommodates a disk medium on which to retain programs and content data. The content reproduction device 13 reproduces the content data retrieved from the storage device 12 by the terminal control device 11. The content output device 17 is constituted illustratively by speakers and/or headphones for outputting music contents and by a liquid crystal display for outputting video contents. Alternatively, the content output device 17 may be externally connected to the terminal 10.

The operation input device 14 is used by the user A to perform operations on and effect input to the terminal 10. The network connection device 15 is designed to connect the terminal 10 with the network 1 using a web browser or the like.

The biometric sensor 21 is designed to detect the user A's biological condition as biological information. The A/D converter 22 converts the biological information thus detected into digital data that is output as biological information data. The environmental sensor 23 detects the user A's ambient or natural environment as environmental information. The A/D converter 24 converts the environmental information thus detected into digital data that is output as environmental information data.

The key generation device 16 of this example acquires at least two kinds of information from the following: biological information data from a biological information detection block composed of the biometric sensor 21 and A/D converter 22; environmental information data from an environmental information detection block made up of the environmental sensor 23 and A/D converter 24; and time-of-day information (data) indicative of the current time (i.e., year, day of the month, day of the week, hours, minutes, and seconds) from the calendar clock circuit 25. The key generation device 16 merges the items of information acquired as change information data into key information (key value) about the user A, in a manner to be discussed later.

The terminal 30, for use by a user B, has a terminal control device 31 connected with a storage device 32, a content reproduction device 33, an operation input device 34, a network connection device 35, and a key generation device 36. The content reproduction device 33 is connected to a content output device 37. The key generation device 36 is connected to a calendar clock circuit 45 as well as to a biometric sensor 41 and an environmental sensor 43 through A/D converts 42 and 44, respectively. The terminal 30 is structured in the same manner as the terminal 10 in both hardware and software terms. In this setup, the key generation device 36 of the terminal 30 generates key information about the user B.

The terminal 50, for use by a user C, is shown containing only a terminal control device 51, a storage device 52, a content reproduction device 53, a network connection device 55, and a key generation device 56 for purpose of illustration and simplification. The terminal 50 is also structured in the same manner as the terminals 10 and 30.

The server 70 is set up illustratively by a content distributor. The server 70 has a server control device 71 connected with a content database 72, a network connection device 73, and a key generation device 74.

The server control device 71 is constituted by a CPU, a ROM that has programs and data written therein, and a RAM into which programs and data are loaded for execution. In operation, the server control device 71 controls the components of the server 70 and carries out processes associated with key uses, as will be described later.

The content database 72 is designed to accommodate numerous items of content data. The network connection device 73 connects the server 70 to the network 1.

The key generation device 74, as will be explained later, receives a plurality of items of change information data from a user terminal such as the terminal 10 or 30 through the network connection device 73 and server control device 71, and merges the received items of change information data into key information about one or a plurality of users.

2. Key Generating Methods Embodying the Invention: FIGS. 2A Through 5

(2-1. Change Information for Generating Keys)

A key generating method according to the present invention involves merging a plurality of kinds of change information (change information data) into key information.

As will be described later, the key information generated by this method may be used as change information for generating another key information.

<Biological Information>

Biological information is information which represents physiological or biochemical conditions or body motions of a user (person), such as heartbeat, pulse beat, breathing, blood pressure, electrocardiogram, electroencephalogram, magnetoencephalogram, sweating, skin resistance, electromyogram, body surface temperature, pupil diameter, and microvibration.

In the example of FIG. 1, the biometric sensors 21 and 41 detect the biological conditions of the users A and B, respectively, as biological information. The biometric sensors and biological information detection block may by constituted by diverse types of detecting means and devices depending on the object to be detected. For example, body motions such as footsteps and arm swings may be detected using acceleration sensors or video cameras.

<Environmental Information>

Environmental information is information which denotes aspects of the environment and divides into two broad categories: information indicative of the user's ambient environment, and information representative of the natural environment. The user's ambient environment refers illustratively to the temperature of the user's room and the level of noise surrounding the user. The natural environment includes weather, temperature, humidity and the tide, among others. It should be noted that the weather, temperature, and humidity around the user who is staying outdoors constitutes the user's ambient environment.

In the example of FIG. 1, the environmental sensors 23 and 43 detect the ambient or natural environment of the users A and B, respectively, as environmental information. The environmental sensors and environmental information detection block may by constituted by diverse types of detecting means and devices depending on the object to be detected.

<Time-of-Day Information>

Although not associated with any specific user, time-of-day information may be employed as change information because time changes incessantly from moment to moment.

In the example of FIG. 1, the calendar clock circuits 25 and 45 measure the current time as time-of-day information.

<Position Information>

Although not shown in the example of FIG. 1, a GPS (global positioning system) device may be used to determine where the user is currently located. The position information thus detected may be utilized as change information.

In that case, if the user's position is expressed illustratively as "near the seashore," "at the foot of a mountain" or "in the neighborhood of Tokyo Station," then that position information becomes information which denotes the natural environment or the user's ambient environment.

<Other Change Information>

Although not shown in the example of FIG. 1, a suitable device may be used to detect the activities of an animal kept by the user as a pet or the motions of an entertainment robot such as "AIBO" (registered trademark) owned by the user as motion information. The motion information thus detected may be used as change information.

Figure 2A:
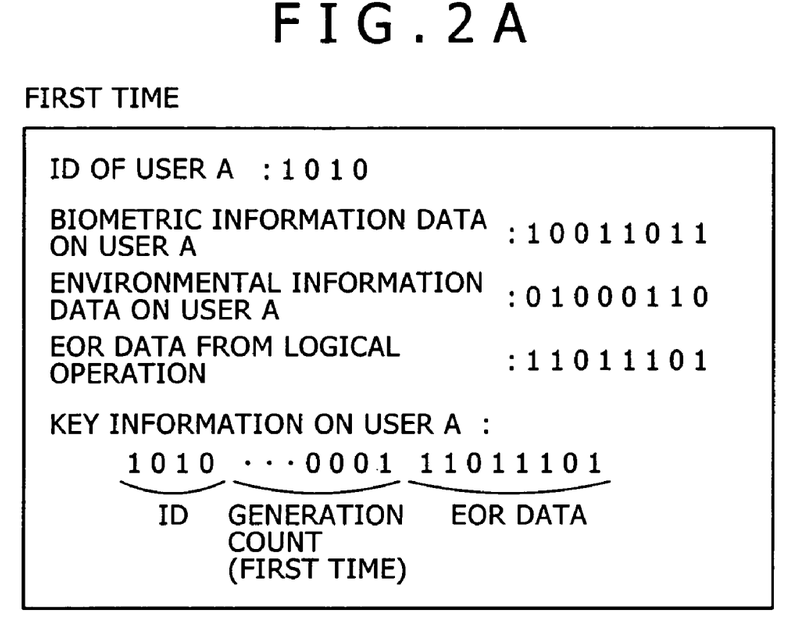
FIGS. 2A and 2B are schematic views showing an example in which key information about a user is generated.
Figure 2B:
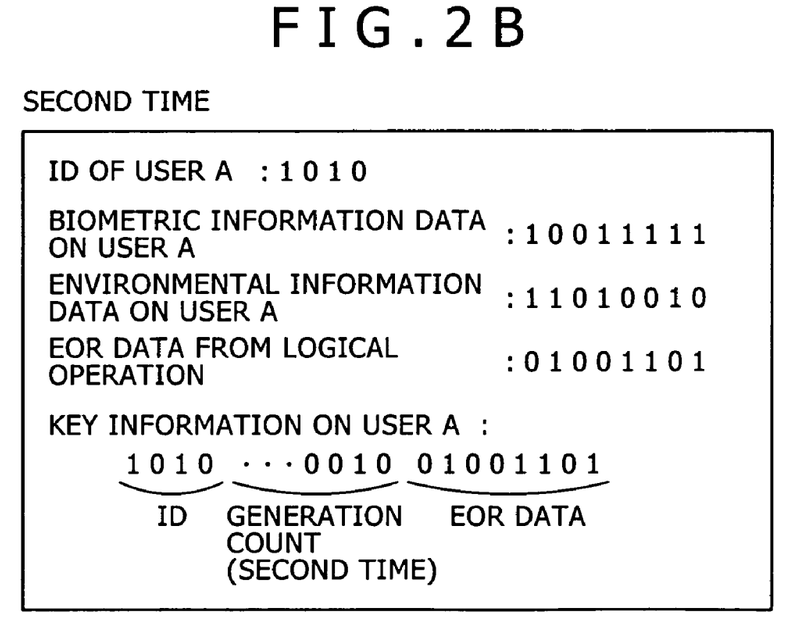
Figure 3:
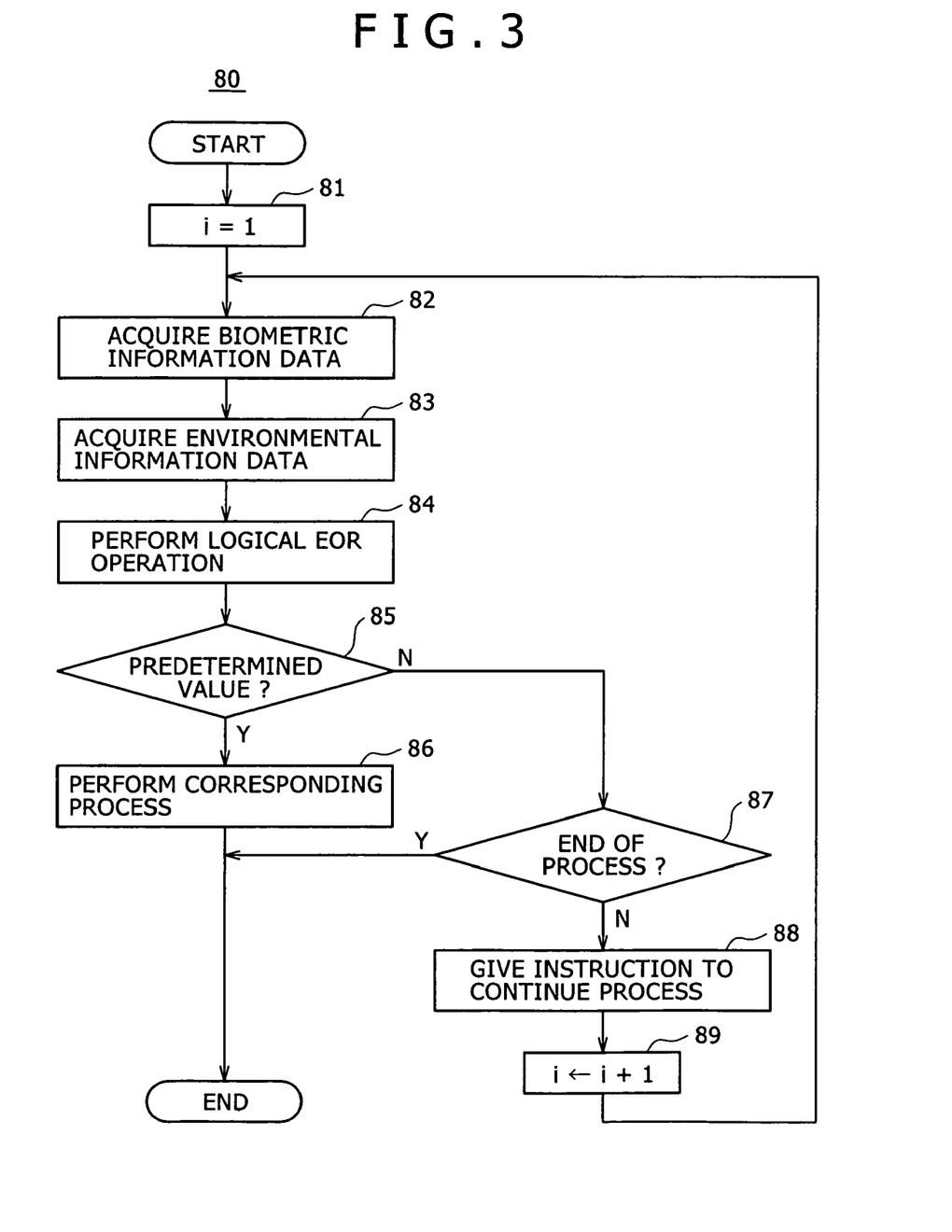
FIG. 3 is a flowchart of steps constituting a process performed by a terminal.

(2-2. Generation and use of keys on one terminal: FIGS. 2A Through 3)

<Examples of Key Generation and Key Information>

Suppose that in the example of FIG. 1, key information for the user A is to be generated on the terminal 10. In that case, the key generation device 16 illustratively merges the biological information data coming from the A/D converter 22 with the environmental information data output by the A/D converter 24 into key information.

More specifically, the ID for the user A (terminal 10) may be expressed by a four-bit binary code, a generation count of the key information by a binary code of a predetermined number of bits (multiple bits), and biological and environmental information data by an eight-bit binary code each.

The generation count of the key information indicates how many times the key in question has been generated since the user A instructed the terminal 10 to perform key generation. The terminal 10 is structured so that the key generation device 16 acquires biological and environmental information data at intervals of, say, several seconds in order to generate key information.

Illustratively, the biological information data is merged with the environmental information data by carrying out the EOR (exclusive-OR) operation on each of the digits (i.e., bits) constituting the biological and environmental information data.

Suppose that as shown in FIG. 2A, the ID of the user A is "1010," that biological information data at first-time key generation is "10011011," and that environmental information data is "01000110." In that case, the data resulting from the EOR operation is "11011101." Given these items of data, key information is generated in such a manner that its high-order four bits are composed of the user A's ID, its predetermined number of bits in the middle are constituted by the key generation count (first time in this case), and its low-order eight bits are made up of the data resulting from the EOR operation, as shown at the bottom of FIG. 2A.

Suppose now that as shown in FIG. 2B, biological information data at second-time key generation is "10011111" and that environmental information data is "11010010." In that case, the data resulting from the EOR operation is "01001101." From these items of data, key information is generated in such a manner that its high-order four bits are composed of the same user A's ID, its predetermined number of bits in the middle are constituted by the key generation count (second time in this case), and its low-order eight bits are made up of the data resulting from the EOR operation, as shown at the bottom of FIG. 2B.

As described, biological information and environmental information may vary every time a new key is generated. That means the resulting key information can change at each key generation time.

<A Typical Process Performed by the Terminal>

The key information thus generated about the user A may be utilized by the terminal 10 alone illustratively for presenting contents. In such a case, the terminal control device 11 of the terminal 10 regards the EOR-derived data in the key information as the key proper (i.e., actual key information) and checks to determine whether the key proper has a predetermined value (i.e., falls within a predetermined range). The terminal control device 11 carries out a suitable process in accordance with the result of the check.

FIG. 3 is a flowchart of steps constituting a typical process performed by the key generation device 16 and terminal control device 11 of the terminal 10.

In this terminal process 80, the user A starts up the terminal 10 and gives an instruction to generate a key. In response, the key generation device 16 goes to step 81 and, given an instruction to start the process from the terminal control device 11, sets "1" to a value "i" indicative of a key generation count on the key generation device 16.

In step 82, the key generation device 16 acquires the biological information data output by the A/D converter 22. In step 83, the key generation device 16 acquires the environmental information data output by the A/D converter 24.

In step 84, the key generation device 16 performs the EOR operation on the biological and environmental information data so as to generate key information.

In step 85, the terminal control device 11 checks to determine whether the EOR-derived data in the key information generated by the key generation device 16 is a predetermined value. If the EOR-derived data is found to be the predetermined value, the terminal control device 11 goes to step 86 and carries out a corresponding process, to be described later.

If the EOR-derived data is not found to be the predetermined value, the terminal control device 11 goes from step 85 to step 87. In step 87, the terminal control device 11 checks to determine whether or not to terminate this process regarding key generation and key utilization. If the terminal control device 11 determines that the process is to be terminated in response to, say, an ending instruction from the user A, then the terminal control device 11 brings the process regarding key generation and key utilization to an end.

If it is determined in step 87 that the process is not to be terminated, the terminal control device 11 goes from step 87 to step 88. In step 88, the terminal control device 11 instructs the key generation device 16 to continue its processing. In response, the key generation device 16 increments the value "i" (key generation count) by "1" and returns to step 82. Then the next round of key generation is started.

The key information thus generated may be utilized for diverse purposes as mentioned later. In the above example, the terminal 10 is structured illustratively so that if the EOR-derived data is not found to be the predetermined value, one or a plurality of contents recorded in the storage device 12 of the terminal 10 will not be reproduced, and that if the EOR-derived data is found to be the predetermined value, that one or multiple contents may be reproduced.

The terminal structure above allows specific contents to be reproduced illustratively when the user A's particular biological condition or ambient environment has attained a predetermined state.

Alternatively, the terminal 10 may be structured in such a manner that if the EOR-derived data is found to be the predetermined value, the key generation device 16 will not generate key information until the user A gives an instruction to generate a key, which keeps particular contents reproducible; and that if the EOR-derived data is found to be the predetermined value and if a predetermined time period elapses since the detection of that value, then the key generation device 16 resumes generating key information and again performs the terminal process such as the one shown in FIG. 3.

If the process regarding key generation and key utilization is performed by the terminal 10 as described above, there is no need for the terminal 10 to have capabilities to connect with the network 1.

<Transmission of Key Information to the Server>

The network system above may be so structured as to bring about the following: the key information generated by the key generation device 16 of the terminal 10 is transmitted to the server 70. In turn, the server control device 71 checks to determine whether the transmitted key information is a predetermined value. Only when the transmitted key information is found to be the predetermined value, does the server control device 71 permit the user A to gain access to one or a plurality of particular contents in the content database 72 so that the accessed contents may be delivered to the terminal 10.

In the preceding case, the user A may receive specific contents from the server 70 only if the user's particular biological condition or ambient environment has reached a predetermined state. The received contents may be reproduced on a streaming basis or downloaded into the storage device 12.

<Other Examples of Key Generation and Key Information>

In place of, or in addition to, biological information data or environmental information data, the time-of-day data output by the calendar clock circuit 25 of the terminal 10 may be used as an item of change information data. In that case, the EOR operation is performed on each of the digits constituting the biological or environmental information data and the time-of-day data, or on each of the digits making up the biological and environmental information data as well as the time-of-day data. The result from the EOR operation may be utilized as key information.

As another alternative, the data representative of a key generation count may be used as an item of change information data. In this case, it is possible to generate key information by adding the key generation count data to biological information data, to environmental information data, or to the EOR-derived data, the added data being values of a different number of digits each. Illustratively, if the key generation count data is added as a value of a different number of digits, the key proper (actual key information) is formed by a portion combining the generation count data with the EOR-derived data in the key information as shown at the bottom of FIGS. 2A and 2B.

As a further alternative, it is possible to calculate data on a correlation between biological information data and environmental information data through matched filtering. The correlation data thus obtained may be used as key information.

As an even further alternative, key information may be generated through the use of information about the motions of the above-mentioned pet or entertainment robot as an item of change information in place of environmental information.

In the case above, it is possible illustratively to bring about a situation where the user A can reproduce specific contents only if the user A's emotion is surging while his or her pet is asleep, or only if the user A's movement and that of the robot are synchronized.

Figure 4A:
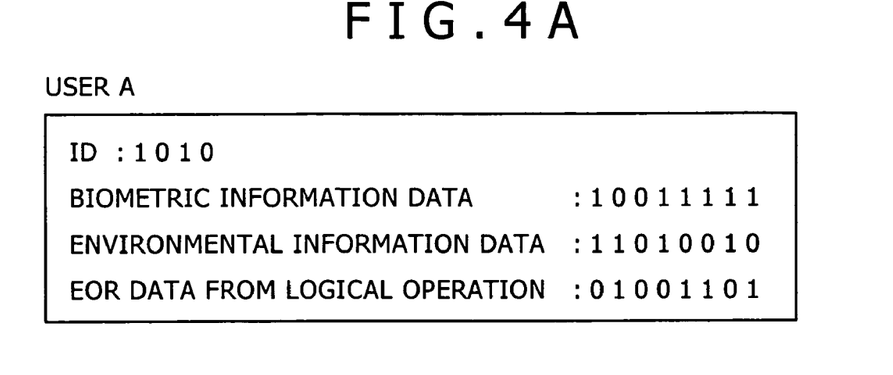
FIGS. 4A, 4B and 4C are schematic views showing an example in which new key information is generated from key information about a plurality of users.
Figure 4B:
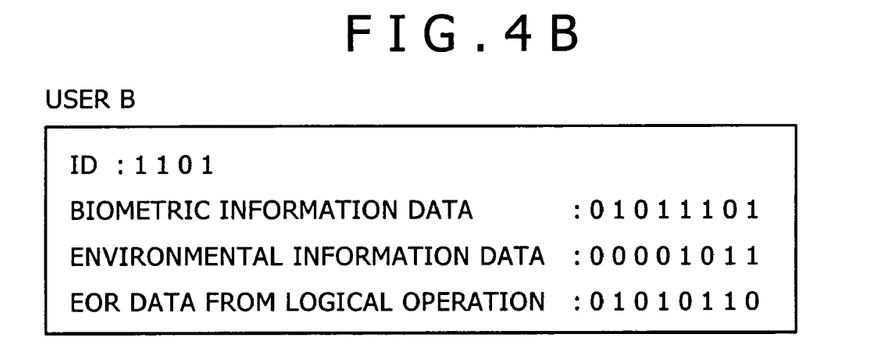
Figure 4C:
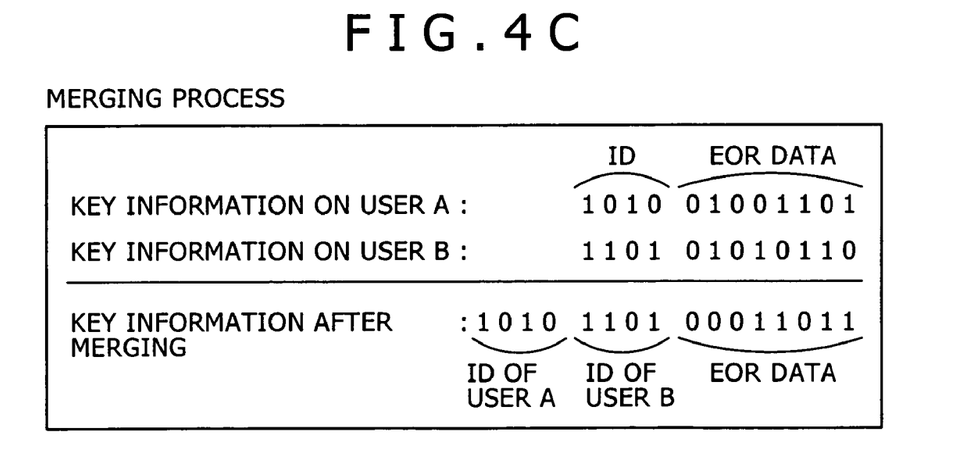
Figure 5:
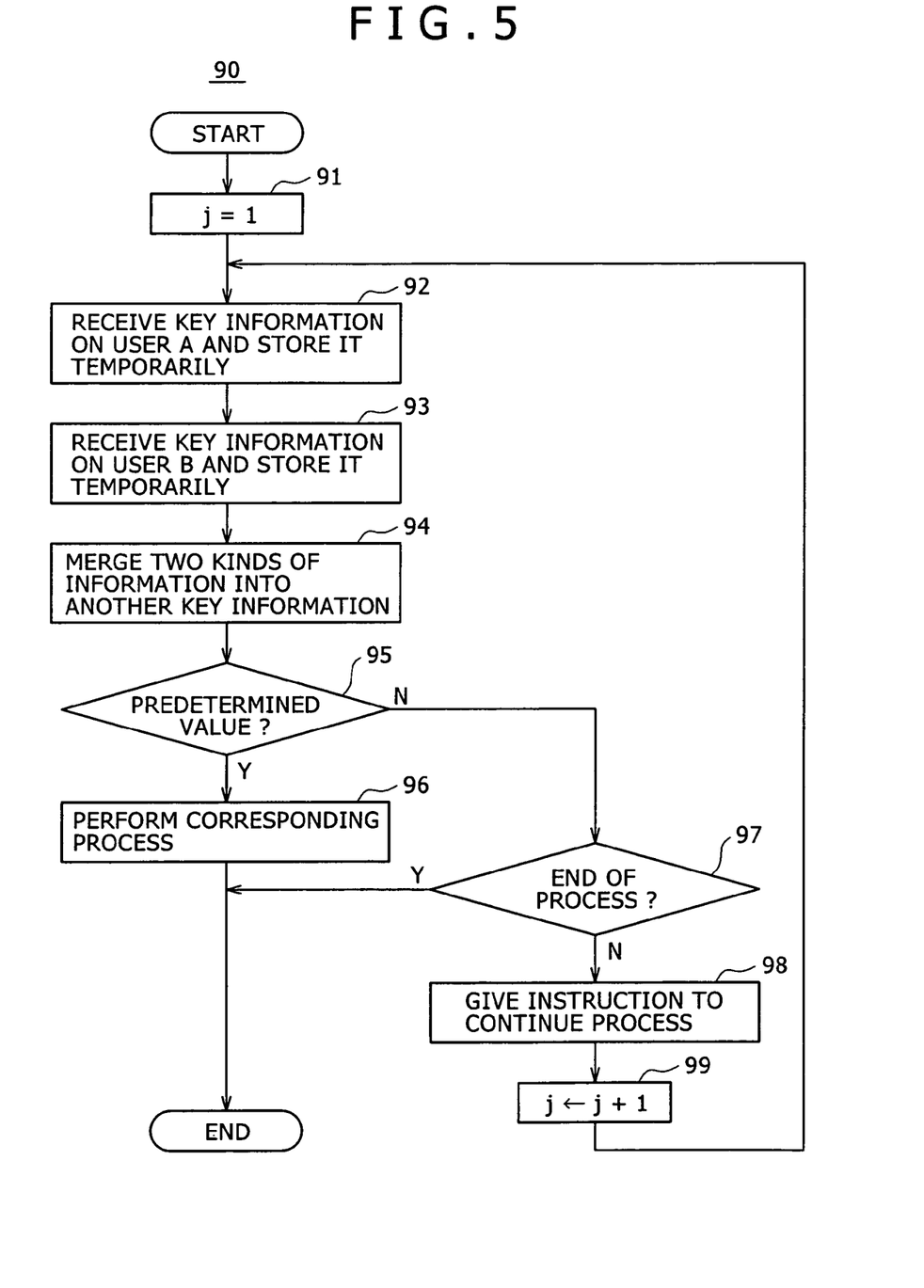
FIG. 5 is a flowchart of steps constituting a process performed by a server.

(2-3. Key Generation by the Network System: FIGS. 4A Through 5)

The network system illustrated in FIG. 1 can generate key information in diverse manners as follows:

(a) The key information about the user A is generated by the terminal 10 and transmitted from there to the server 70. The key information about the user B is generated by the terminal 30 and also transmitted from there to the server 70. The key generation device 74 of the server 70 generates another, secondary key information based on the received information.

(b) The terminal 10 transmits one item of change information data (e.g., biological information data) to the server 70. The terminal 30 transmits another item of change information data (e.g., biological information data) to the server 70. The key generation device 74 of the server 70 generates key information based on the received data.

(c)<c1> The terminal 10 transfers one item of change information data (e.g., biological information data) to the terminal 50. The terminal 30 transfers another item of change information data (e.g., biological information data) to the terminal 50. The key generation device 56 of the terminal 50 generates key information based on the received data. <c2> Alternatively, the terminal 10 transfers the key information about the user A to the terminal 50. The terminal 30 transfers the key information about the user B to the terminal 50. The key generation device 56 of the terminal 50 generates secondary key information based on the received information.

(d)<d1> The terminal 30 transfers an item of change information data (e.g., biological information) to the terminal 10. The key generation device 16 of the terminal 10 merges another item of change information data (e.g., biological information data) obtained by the terminal 10 with the change information data transferred from the terminal 30, thereby generating the key information about the user A. <d2> Alternatively, the terminal 30 transfers the key information about the user B to the terminal 10. The key generation device 16 of the terminal 10 merges the primary key information about the user A generated by the device 16 itself with the key information about the user B transferred from the terminal 30, thereby generating the secondary key information about the user A.

<Key Generation and Key Information in the Case of (a) Above>

In the case of (a) above, the key generation device 16 of the terminal 10 performs, every time a key is to be generated (FIGS. 2A and 2B), the EOR operation on each of the digits constituting biological information data and environmental information data in order to generate the key information about the user A as shown in FIG. 4A. The key information thus generated is transmitted by the terminal control device 11 to the server 70.

Each time a key is to be generated, the key generation device 36 of the terminal 30 also performs, as indicated in FIG. 4B, the EOR operation on each of the digits making up biological information data and environmental information data so as to generate the key information about the user B. The generated key information is transmitted by the terminal control device 31 to the server 70.

In the case above, the terminals 10 and 30 need not be connected synchronously to the server 70 when starting their key generation.

In the server 70, the key generation device 74 receives through the server control device 71 the key information about the users A and B sent from the terminals 10 and 30, respectively. The key generation device 74 merges the received items of key information into another, then generates secondary key information.

The merge involves performing the EOR operation on each of the digits constituting the EOR-derived data in the key information about the user A and the EOR-derived data in the key information about the user B, as shown in the merged key information given in FIG. 4C.

It should be noted, however, that the ID of the user A and that of the user B are placed ahead of the data resulting from the EOR operation.

The key information derived from the merge may be used either as the key information about both the user A and the user B, or as the key information about one of the two users, as will be discussed later.

FIG. 5 is a flowchart of steps constituting a typical process performed by the key generation device 74 and server control device 71 of the server 70.

In this server process 90, the terminals 10 and 30 first connect to the server 70 and start transmitting their key information to the server 70. In step 91, the key generation device 74 of the server 70, given an instruction to start the process from the server control device 71, sets "1" to a value "j" indicative of a key generation count on the key generation device 74.

In step 92, the key generation device 74 receives the key information about the user A from the terminal 10 and stores the received key information temporarily into an internal memory of the device 74. In step 93, the key generation device 74 receives the key information about the user B from the terminal 30 and places the received key information temporarily into the internal memory of the device 74.

In step 94, the key generation device 74 generates (secondary) key information through merging as described above.

In step 95, the server control device 71 checks to determine whether the EOR-derived data in the key information generated by the key generation device 74 is a predetermined value. If the EOR-derived data is found to be the predetermined value, the server control device 71 goes to step 96 and carries out a corresponding process, to be described later.

If in step 95 the EOR-derived data is not found to be the predetermined value, then the server control device 71 goes from step 95 to step 97. In step 97, the server control device 71 checks to determine whether or not to terminate this process regarding key generation and key utilization. If the server control device 71 determines that the process is to be terminated because of, say, a disconnection of the server 70 from the terminal 10 or 30, then the server control device 71 brings the process regarding key generation and key utilization to an end.

If it is determined in step 97 that the process is not to be terminated, the server control device 71 goes from step 97 to step 98. In step 98, the server control device 71 instructs the key generation device 74 to continue its processing. In response, the key generation device 74 increments the value "j" (key generation count) by "1" and returns to step 92. Then the next round of key generation is started.

The secondary key information generated by the key generation device 74 of the server 70 as described above may be utilized in one of the following two ways ((x) or (y)):

(x) The secondary key information is used as the key information about both the user A and the user B. Only when the EOR-derived data in the key information is found to be a predetermined value, does the server 70 authorize the users A and B to access one or a plurality of particular contents in the content database 72 and to have them delivered to the terminals 10 and 30. The delivered contents may be reproduced on a streaming basis or downloaded into the respective storage devices.

(y) The secondary key information is used as the key information about one of the two users who is selected according to a predetermined criterion, as when one of the users is designated in advance. Only when the EOR-derived data in the key information is found to be a predetermined value, does the server 50 authorize the user in question to access one or a plurality of particular contents in the content database 72 and to have them delivered to the user's terminal. The delivered contents may then be reproduced on a streaming basis or downloaded into the storage device.

In the case of (x) above, the users A and B are allowed to receive specific contents from the server 70 only if their biological conditions and ambient environment have reached a particular state, the received contents being reproduced in streaming fashion or downloaded into storage.

In the case of (y) above, one of the users A and B is allowed to receive specific contents from the server 70 only if both users' biological conditions and ambient environment have reached a particular state, the received contents being reproduced in streaming fashion or downloaded into storage.

<Key Generation and Key Information in the Cases of (b), (c) and (d) Above>

In the cases of (b), (c) and (d) above, keys may be generated and the key information may be utilized in the same manner as in the case of (a) above.

More specifically, in the case of (c), the user C is allowed to reproduce one or a plurality of particular contents in the storage device 52 of the terminal 50 illustratively when the change information data or key information about the user A and the change information data or key information about the user B are found to be predetermined values. In the case of (d), the user A is authorized to reproduce one or a plurality of particular contents in the storage device 12 of the terminal 10 illustratively when the change information data or primary key information about the user A himself or herself and the change information data or key information about the user B are found to be predetermined values.

3. Examples of Key Utilization

The key information generated according to the present invention may be utilized illustratively as follows:

The key information may be used to search for, select, present, or adjust contents. For example, when the value of the key information is found to fall within a predetermined range, the user may be allowed to search for or select contents and to cause the terminal or server to present the contents. In another example, the tempo and volume of music, the brightness and contrast of videos, or the coloring and luminance of lighting fixtures may be adjusted automatically in keeping with the value of the key information.

The key information may be presented unmodified to the user as numerical information, or may be converted into such information as tunes, videos, characters, graphics, or environment parameters that may be presented to the user. Furthermore, the environment parameters derived from the conversion may be used to adjust such environmental conditions as the temperature and humidity of a room.

In a further example, the key information may be used as keys by which to reminisce past records. Specifically, a plurality of users may enjoy chats or share certain contents. In such cases, the users involved may record the chats or the shared contents together with the key information generated at these times as well as applicable time stamps, play stamps, scenery captured on photos, and locations measured by GPS. Later, the users may utilize the key information to recall panoramically what took place at the times of key generation.

In a still further example, the key information may be used to start, operate, connect, or otherwise control equipment. Specifically, when the value of the key information is found to fall within a predetermined range, it is possible to get an apparatus or apparatuses automatically started, operated, or interconnected. It is also possible to change, say, the operation mode of a device or the vibration mode of a vibrator in keeping with the value of the key information.

In a yet further example, the key information may be used as a key to unlock doors and other physical objects. In such cases, what is generated is an unusual key that can unlock the target object only if the user's specific physical condition or ambient environment is in a particular state.

It should be understood by those skilled in the art that various modifications, combinations, sub-combinations and alterations may occur depending on design requirements and other factor in so far as they are within the scope of the appended claims or the equivalents thereof.

What is claimed is:

1. A computer-implemented key generating method comprising the steps of:
   operating at least one processor on at least one computer to perform acts of:
   detecting first change information as first change information data;
   detecting second change information different from said first change information as second change information data;
   merging a value indicative of a key generation count, said first change information and said second change information into key information;
   determining whether a value of the key information is within a predetermined range;
   when the value of the key information is not within the predetermined range, then incrementing the value indicative of a key generation count and repeating the acts of detecting first change information, detecting second change information, merging, and determining; and
   when the value of the key information is within the predetermined range, then performing additional processing, wherein:
   the first change information comprises information indicative of a biological condition of a user;
   the second change information comprises information indicative of activities of an animal kept by the user as a pet; and
   determining whether the key information is within a predetermined range is indicative of a determination that the emotion of the user surges while the pet of the user is asleep.

2. The key generating method according to claim 1, wherein said first change information and said second change information each comprises change information about an identical user.

3. The key generating method according to claim 2, wherein said first change information is indicative of a biological condition of the user and said second change information is indicative of an ambient environment of said user.

4. The key generating method according to claim 1, wherein said first change information is associated with a first user and said second change information is associated with a second user.

5. The key generating method according to claim 1, wherein said merging act comprises adding the value indicative of a key generation count to the result of performing an EXCLUSIVE-OR operation on each of digits constituting said first change information data and said second change information data.

6. The key generating method according to claim 1, wherein said merging act comprises adding the value indicative of a key generation count to a result of calculating data on a correlation between said first change information data and said second change information data.

7. The key generating method according to claim 1, wherein the value indicative of the key generation count has a different number of digits than each of the first change information data and the second change information data.

8. The key generating method according to claim 1, wherein the acts of detecting first change information, detecting second change information, merging, and determining are performed by at least one processor of a user terminal.

9. The key generating method according to claim 1, wherein the acts of detecting first change information and detecting second change information are performed by at least one processor of a user terminal and the acts of merging and determining are carried out by at least one processor of a server connected to said user terminal via a network.

10. The key generating method according to claim 4, wherein the act of detecting first change information is performed by at least one processor of a first user terminal, the act of detecting second change information is performed by at least one processor of a second user terminal, and the acts of merging and determining are performed by at least one processor of a server connected to said first and said second user terminals via a network.

11. The key generating method of claim 1, wherein one of the first change information and the second change information is time-of-day information.

12. The key generating method of claim 1, wherein the additional processing comprises adjusting temperature and humidity of a room.

13. The key generating method of claim 1, wherein the additional processing comprises automatically adjusting coloring and/or luminance of lighting fixtures.

14. The key generating method of claim 1, wherein the additional processing comprises automatically adjusting brightness and contrast of videos.

15. The key generating method of claim 1, wherein:
   the acts of detecting first change information, detecting second change information, and merging are performed by at least one processor of a first user terminal to generate first key information associated with a first user;
   the acts of detecting first change information, detecting second change information, and merging are further performed by at least one processor of a second terminal to generate second key information associated with a second user;
   the method further comprises performing by at least one processor of a server an act of merging the first key information and the second key information to generate secondary key information;
   determining whether the key information is within a predetermined range comprises performing by at least one processor of the server an act of determining whether the secondary key information is within the predetermined range; and
   the additional processing is performed by at least one processor on the server.

16. The key generating method of claim 15, wherein the additional processing comprises allowing a single user of the first user and the second user to reproduce contents on a user terminal.

17. The key generating method of claim 15, wherein the additional processing comprises allowing both the first user and the second user to reproduce contents on a user terminal.

18. A key generating apparatus comprising:
   a first detection device configured to detect first change information as first change information data;
   a second detection device configured to detect second change information different from said first change information as second change information data;
   a key generation device configured to merge a value indicative of a key generation count, said first change information, and said second change information into key information; and
   a control device configured to:
   determine whether a value of the key information is within a predetermined range; and when the control device determines that the value of the key information is not within the predetermined range, then instruct the key generation device to increment the value indicative of a key generation count and to repeat the merging with newly detected first change information and second change information, wherein:
the first change information comprises information indicative of a movement of a user;
the second change information comprises information indicative of a movement of an entertainment robot; and
determining whether the key information is within a predetermined range is indicative of a determination that the movement of the user is synchronized with the movement of the entertainment robot.

* * * * *